Jan. 8, 1946.   H. J. LEIBLE   2,392,539
HEATED STEERING WHEEL COVER
Filed Jan. 12, 1944

Harry J. Leible,
INVENTOR.

BY
Victor J. Evans & Co.
ATTORNEYS

Patented Jan. 8, 1946

2,392,539

UNITED STATES PATENT OFFICE 2,392,539

HEATED STEERING WHEEL COVER

Harry J. Leible, Philadelphia, Pa.

Application January 12, 1944, Serial No. 518,000

1 Claim. (Cl. 219—19)

The invention relates to a heater for steering wheels of motor vehicles, and more especially to electric heating covers for steering wheels of automobiles.

The primary object of the invention is the provision of a heater of this character, wherein on the starting of the motor or engine of an automobile the heater becomes active for electrically heating the steering wheel of the vehicle, so that an operator will not suffer with chilled hands while manipulating the said wheel when driving the automobile during cold weather, particularly where the said automobile is not heated interiorly thereof otherwise.

Another object of the invention is the provision of a heater of this character, wherein the same is rendered inactive when the motor is stopped, and only becomes active electrically when the ignition switch is turned on, so that the steering wheel of the vehicle will be heated for the successful handling thereof during the driving of the vehicle of the motor type.

Another object of the invention is the provision of a heater of this character, wherein the same is adaptable to various types of motor vehicles, and in applying the same there is no change necessary in the steering column or the steering wheel, the heater being capable of attachment to standard makes of steering wheels of motor vehicles, and is readily connected to the electrical system, that is to say, the ignition circuit of the vehicle for the operation thereof in heating the steering wheel.

A further object of the invention is the provision of a heater of this character, which is simple in construction, thoroughly reliable and efficient in operation, readily and easily attached to the steering wheel of a motor vehicle, requiring no changes or alterations in the standard construction of the latter, electrically operated through the ignition circuit of the vehicle, and inexpensive to manufacture and install.

With these and other objects in view the invention consists in the features of construction, combination and arrangement of parts as will be hereinafter more fully described, illustrated in the accompanying drawing, which discloses the preferred embodiment of the invention, and pointed out in the claim hereunto appended.

In the accompanying drawing.

Similar reference characters indicate corresponding parts throughout the several views in the drawing.

Figure 1:
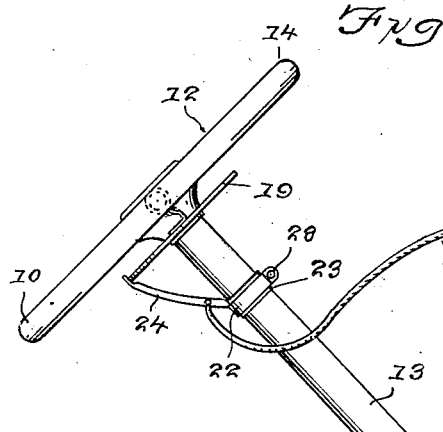
Figure 1 is a fragmentary elevation of a steering wheel of a motor vehicle showing the heater constructed in accordance with the invention applied thereto and in association with the ignition electric circuit for the motor.
Figure 2:
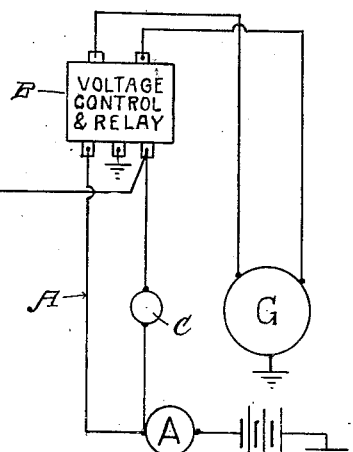
Figure 2 is a top plan view.
Figure 2:
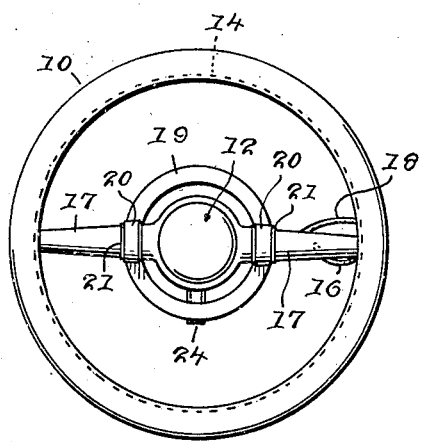
Figure 4:
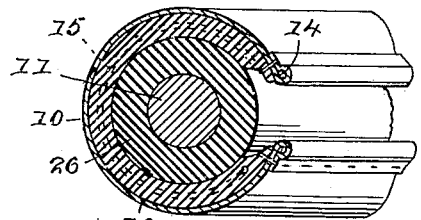
Figure 4 is an enlarged fragmentary detail sectional view through the wheel rim and cover of the heater.
Figure 5:
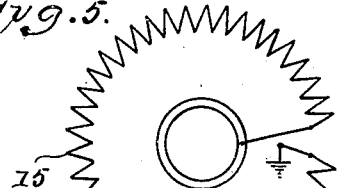
Figure 5 is a diagrammatic view of the resistance coil or heating element.
Figure 3:
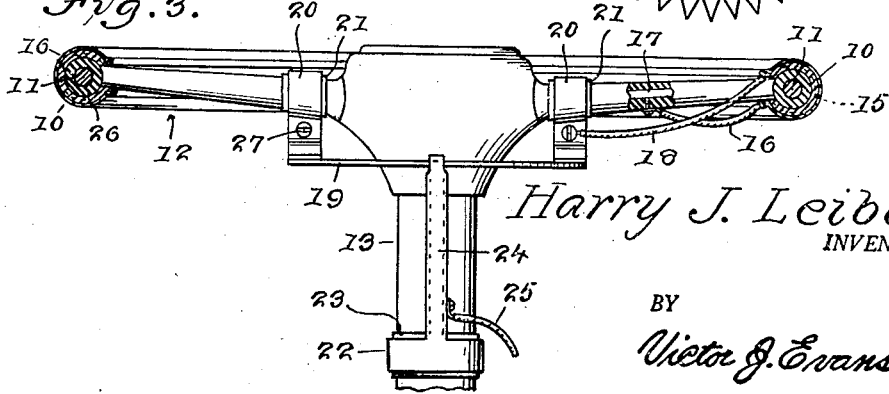
Figure 3 is an enlarged vertical sectional view through the wheel and heater.

Referring to the drawing in detail A designates generally an electric circuit installed within a motor vehicle and includes a voltage control and relay device B as well as a hand operated ignition switch C, of any standard construction, and in association with this system is a steering wheel heater constituting the present invention and hereinafter described in detail.

The heater constituting the present invention comprises a cover 10 of leather, rubber or any other suitable material, such as textile fabric or any flexible substance, creating a shoe for enclosing the rim 11 of a steering wheel 12 attached to a steering column 13 for a motor vehicle, and of standard construction. This cover 10 encases the rim through the medium of a lacing or tacking 14 or otherwise and has embedded therein a resistance or heating coil or element 15, one end of which through the connection 16 is grounded to a spoke 17 of the wheel 12, while the other end has a terminal connection 18 with a ring-like contact 19. The contact 19 has formed therewith releasable clamps 20, which are diametrically opposed to each other and are engaged with opposite spokes of the wheel 12, there being insulating collars 21 between the clamps 20 and the said spokes to avoid short circuiting.

Upon the column 13 adjacent to the contact 19 is a collar 22, it being insulated from the said column by an insulating band 23, and extending from this collar 22 is a resilient brush 24, it having the electrical connection 25 with the circuit A, which latter is closed by turning on the ignition switch C, hereinbefore stated. The brush 24 is continuously in contact with the ring-like contact 19, so that when the circuit A is closed the resistance coil or heating element 15 will be electrically charged for the heating of the cover 10, and thereby heating the rim of the wheel 12. This cover 10 is provided with an insulation lining 26 of asbestos or other insulating material, and in this is embedded the resistance coil or heating element 15, these being unitary with the said cover.

The clamps 20 are fastened in place by fasteners 27, while the clamping collar 22 is secured by a fastener 28, although these may be otherwise secured.

The contact 19 turns with the wheel 12 and the brush 24 is continuously in contact therewith throughout the turning movements of the wheel.

The cover 10 affords a better grip upon the steering wheel when in use, and this wheel is maintained warm when current is turned on to the cover as before described.

What is claimed is:

A heater for a steering wheel having column support and spokes, a cover of circular form having split inner periphery, the edges spaced apart to allow for the spokes, an electric heating element in said cover having one terminal removably connected and grounded on a spoke of the wheel, a circular contact ring below the wheel and surrounding the steering column, clamps carried by opposite edges of the contact for attachment to the spokes of the wheel and connected to the other terminal of the heater, a spring contact brush clamped to the steering column and in constant contact with the ring, and an electric source of supply connected to said spring contact brush.

HARRY J. LEIBLE.